United States Patent [19]

Niskin

[11] 3,971,251

[45] July 27, 1976

[54] DYNAMICALLY BALANCED APPARATUS FOR WATER BORNE INSTRUMENTS

[76] Inventor: Shale J. Niskin, 2941 Lucaya St., Miami, Fla. 33133

[22] Filed: Apr. 16, 1975

[21] Appl. No.: 568,556

[52] U.S. Cl............................................. 73/170 A
[51] Int. Cl.² .................................... G01D 21/00
[58] Field of Search................. 73/170 A, 188, 189, 73/147, 148; 114/235 B

[56] References Cited
UNITED STATES PATENTS

| | | | |
|---|---|---|---|
| 3,144,848 | 8/1964 | Knott et al. | 114/235 B |
| 3,760,761 | 9/1973 | Umazume | 114/235 B |

*Primary Examiner*—Jerry W. Myracle
*Attorney, Agent, or Firm*—Salvatore G. Militana

[57] ABSTRACT

A dynamically balanced apparatus for water borne instruments such as current direction and velocity meters having a stand off support rotatably secured to a cable whose lower end is anchored and its upper end attached to a buoy. A swivelled connector extends from the free end of the stand off to the mid-portion of an elongated cylindrical housing, the latter being rotatably mounted to the connector and weighted along its lower portion whereby the housing assumes a normal predetermined horizontal position at all times. A duct symmetrically disposed at each end of the housing and a water velocity and direction member mounted in each of the ducts. A pair of rudders extending rearwardly of the connector whereby the housing is constantly maintained in a direction facing the current and the ducts in a horizontal position for recording the direction and velocity of the current accurately.

9 Claims, 9 Drawing Figures

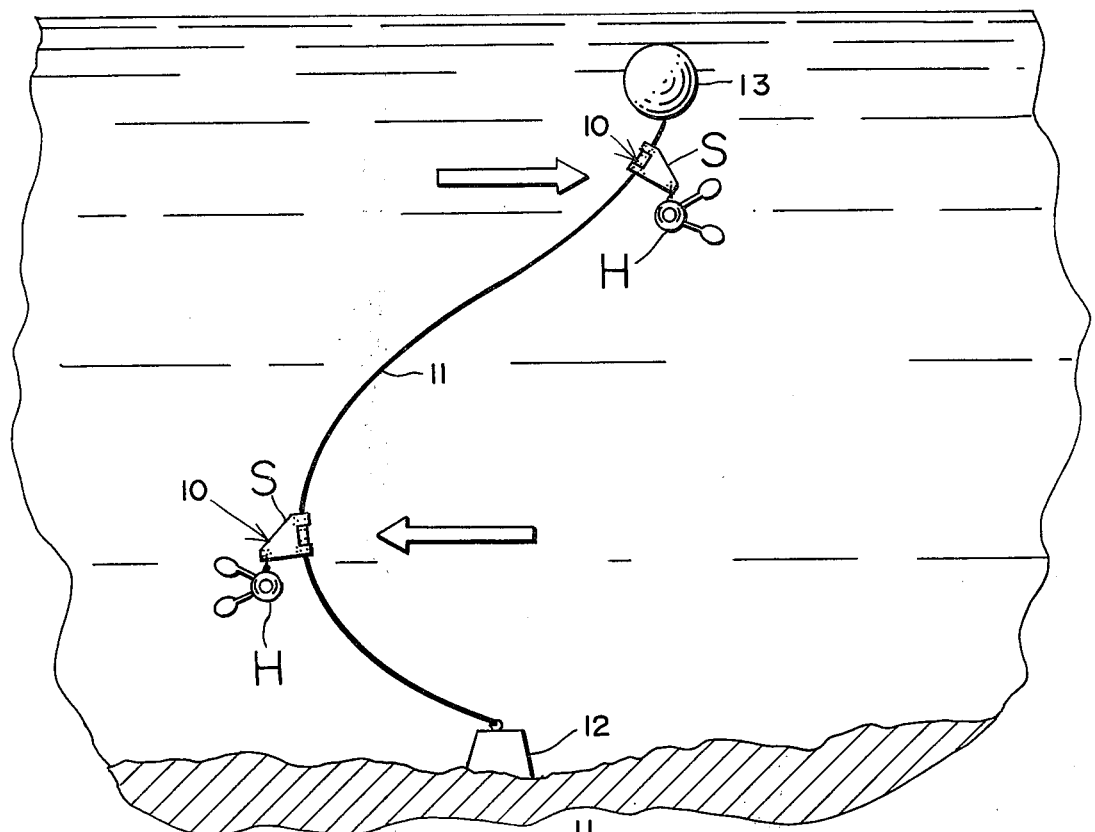
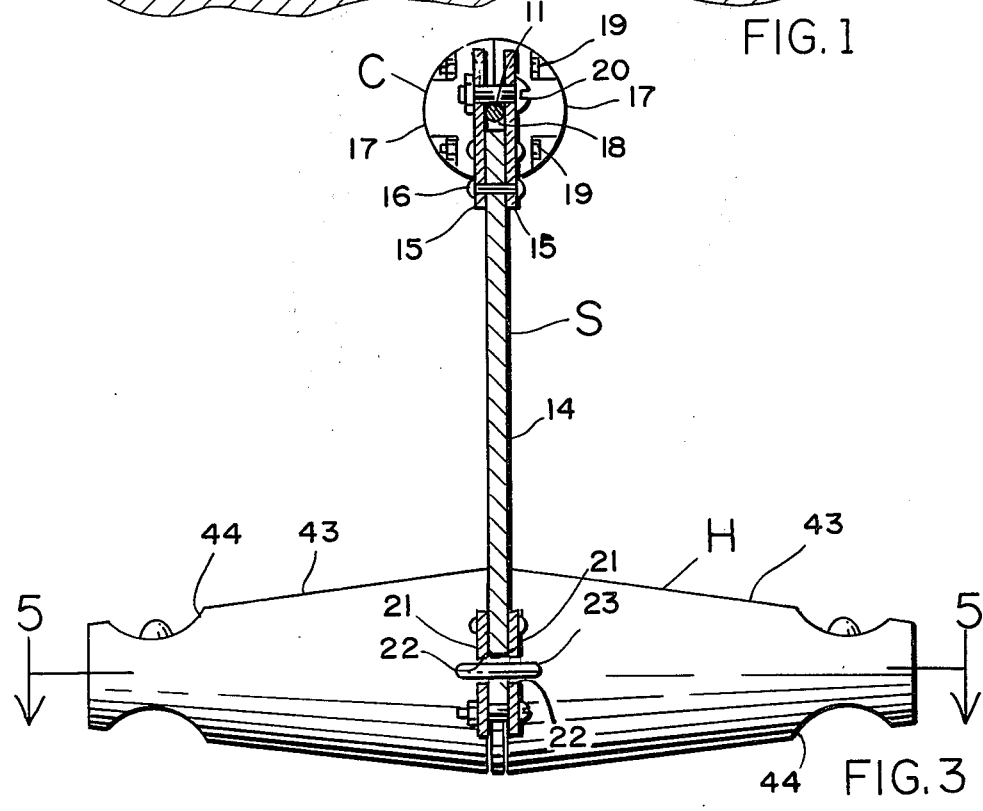

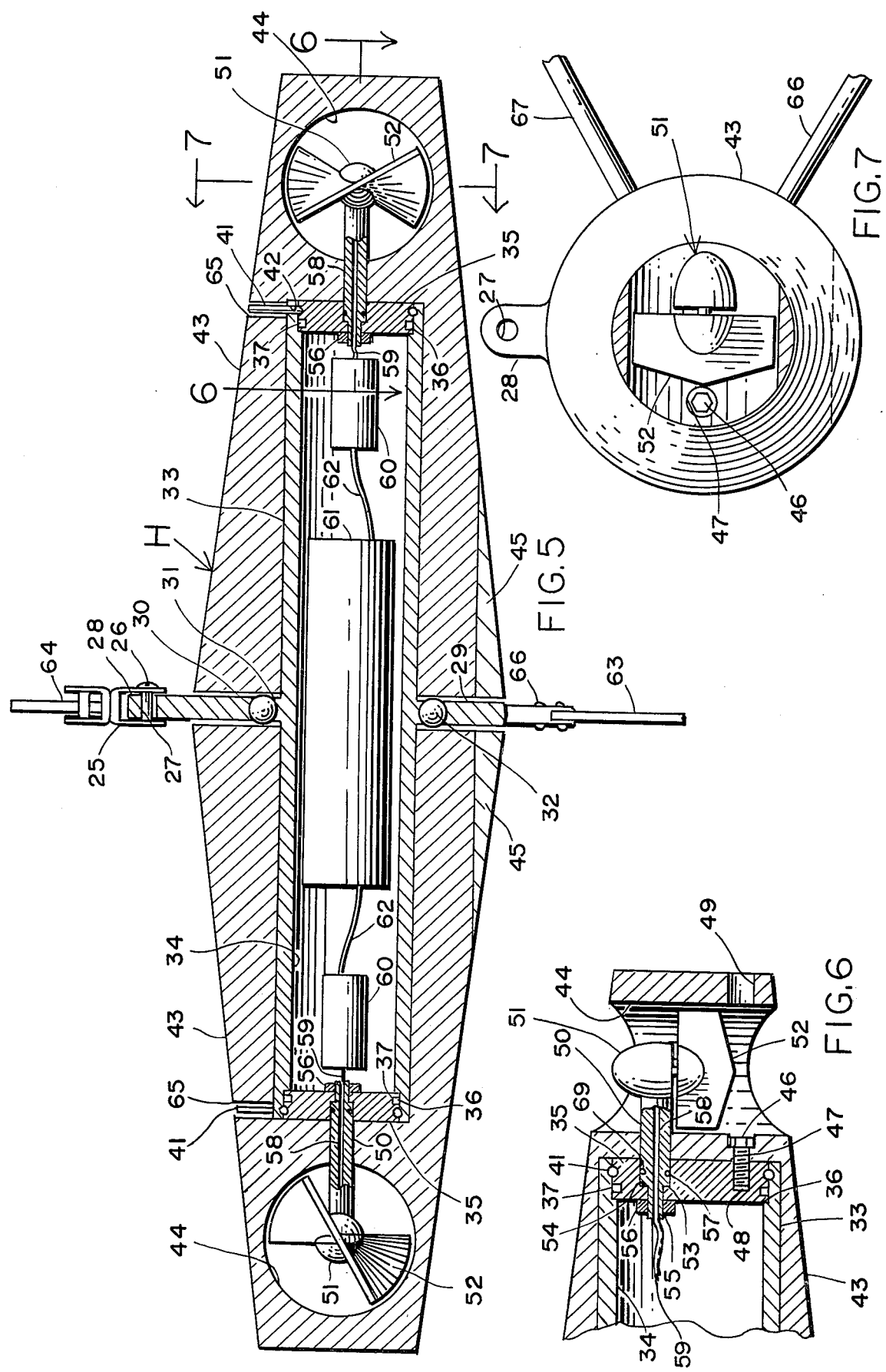

DYNAMICALLY BALANCED APPARATUS FOR WATER BORNE INSTRUMENTS

BACKGROUND OF THE INVENTION

1. Field Of The Invention

This invention is directed to an apparatus that is dynamically balanced for containing water borne instruments that are required to assume a particular attitude or position with relation to the current in the body of water in order to record certain information accurately.

2. Description Of The Prior Art

At the present time there are no devices or apparatuses that are dynamically balanced in currents for all conditions to which the apparatus may be subjected in the water whereby the apparatus will maintain a desired position or attitude in the water. For example, it is absolutely necessary when measuring the flow of water for direction and velocity that the instruments be maintained in a horizontal position and facing the direction of flow of water. So long as the body of water is calm and the current velocity is within certain ranges, the present instruments will give fairly accurate results. However, in the event the current is very fast or the water becomes rough with high and violent wave actions, the float and cable to which the instruments are attached will cause the latter to rise and fall and oscillate or vibrate out of their proper position so that inaccurate results are obtained as to the current velocity and direction. The present invention contemplates avoiding the above objections to the present housings for water borne instruments by providing a housing that is dynamically balanced whereby the housing assumes and maintains a predetermined optimum position for obtaining accurate results of the instruments being supported by the housing.

BRIEF SUMMARY OF THE INVENTION

Therefore, a principal object of the present invention is to provide water borne instruments with a housing that is dynamically balanced whereby the instruments are maintained in the current of the body of water in a predetermined and optimum position for the operation of the instruments in recording accurate information concerning the moving body of water, which information would be inaccurate if the housing did not remain in the desired position at all times and in all conditions of the body of water.

Another object of the present invention is to provide water borne instruments with a dynamically balanced housing that is supported by a cable anchored at one end and having a float at the other end, the housing being pivotally suspended from a stand-off which is rotatably secured to the cable to prevent entanglement of the housing with the cable.

A further object of the present invention is to provide a dynamically balanced housing for water meters measuring water flow direction and velocity wherein the housing is supported at its mid-portion with arm portions extending horizontally and meter mounted on each of the arm portions facing in the direction from which the water flows whereby the housing maintains the aforesaid position in the water to accurately measure the velocity and direction of flow of water.

A still further object of the present invention is to provide a dynamically balanced housing for water borne instruments with a rudder or vane that maintains the housing in alignment with the directional flow of water having a dampening effect on forces attempting to swing the housing out of alignment with the current flow whereby the instruments will measure with accuracy the velocity and direction of the water flow.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE SEVERAL VIEWS

In the drawings:

FIG. 1 is an elevational view of a plurality of my dynamically balanced apparatuses shown mounted on a cable in a body of water for measuring current direction and velocity.

Figure 2:
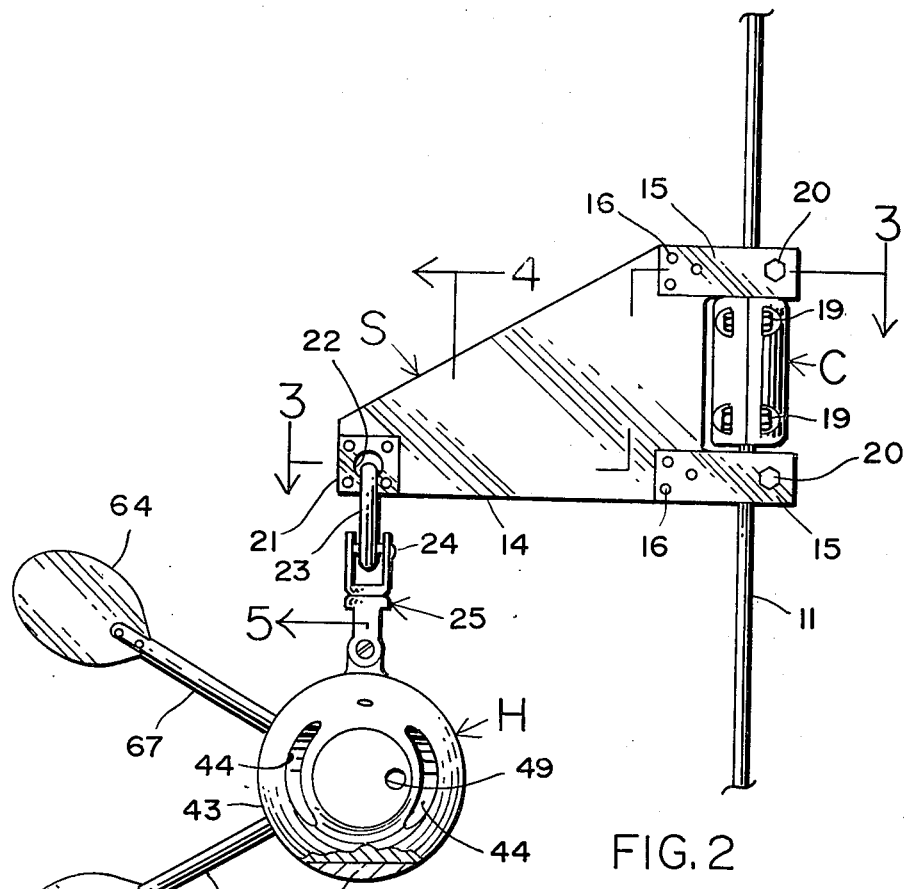
FIG. 2 is an enlarged side elevational view of my apparatus as mounted on the cable.
Figure 4:
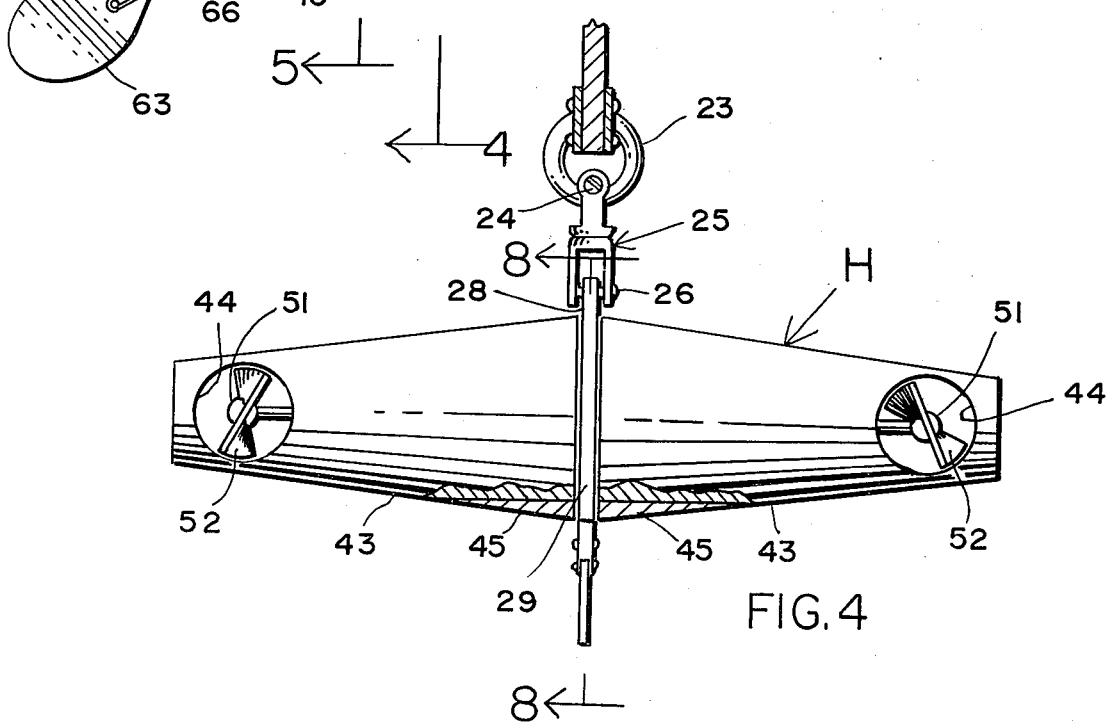

FIGS. 3, 4 and 5 are cross sectional views taken along the lines 3—3, 4—4 and 5—5 respectively of FIG. 2.

FIG. 6 is an enlarged fragmentary cross sectional view of the end portion of the housing.

FIG. 7 is a cross sectional view taken along the line 7—7 of FIG. 5.

Figure 8:
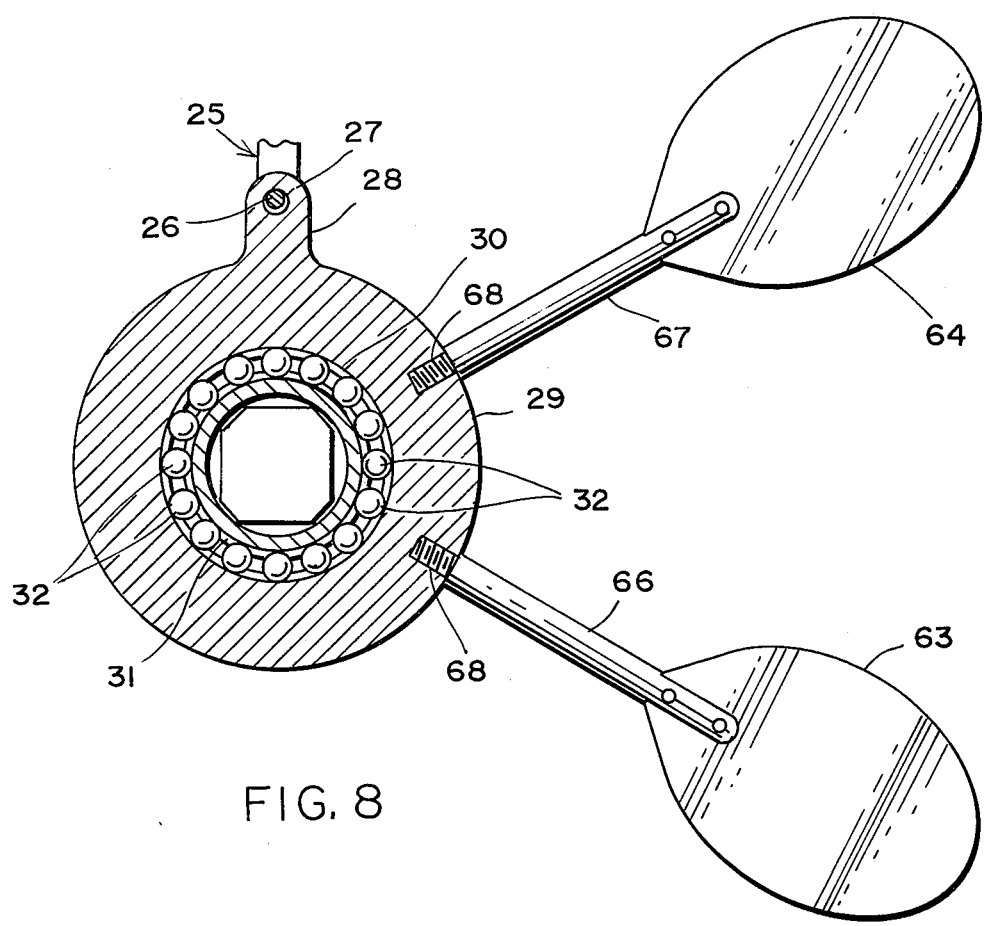

FIG. 8 is a cross sectional view taken along the line 8—8 of FIG. 4.

Figure 9:
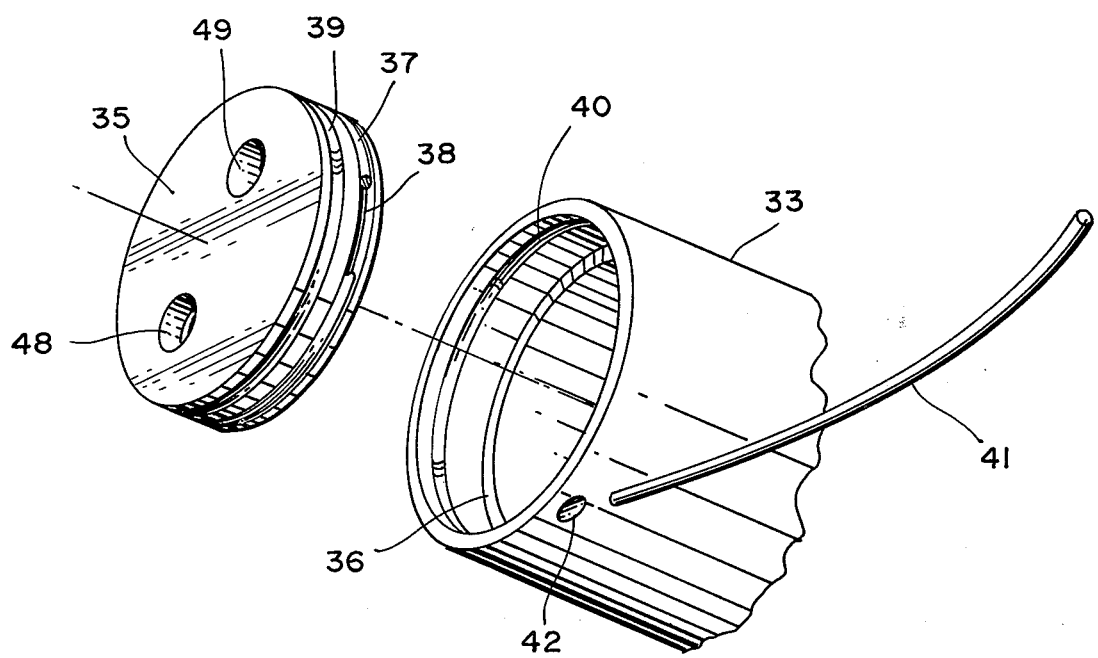

FIG. 9 is an exploded view of the cylinder, cover and locking member.

DETAILED DESCRIPTION OF THE PREFERRED EMBODIMENT

Referring to the drawings wherein like numerals are used to designate similar parts throughout the several views, the numeral 10 refers to my dynamically balanced apparatus shown mounted on a line 11 whose lower end is anchored as at 12 to the bottom of a body of water and having a buoy 13 attached to the upper end. The function of my apparatus 10 is to contain water borne instruments and in this instance there are meters 51 mounted thereon to determine the direction and velocity of the various water currents at predetermined depths in the body of water.

Each of my apparatuses 10 consists of a stand-off support -S- which is attached to the line 11 and an instrument containing housing -H- depending therefrom. It is to be noted that the housing -H- has negative buoyancy and therefore will hang downwardly from the support -S-. However, if it is desired, the housing -H- can have positive buoyancy and thereby would extend upwardly in the body of water. Other than for its difference in buoyancy, the structure and operation of my apparatuses 10 are substantially identical.

The support -S- which is rotatably secured to the cable 11 permits the housing -H- to swing completely about the cable 11 in the horizontal plane without entanglement therewith. The support -S- consists of a somewhat triangular shaped stand-off plate 14 with two pairs of spaced apart extension members 15 mounted along and beyond one side of the plate member 14 at the upper and lower portion thereof. Each pair of extension plates 15 that is bolted to the stand-off plate 14 by bolts 16 are positioned in spaced apart relation to receive a wire clamp -C- that is fixedly secured to the cable 11. The wire clamp -C- is of conventional structure consisting of a pair of semi-cylindrical member 17 at whose axis there is a pair of semi-cylindrical bores 18 whose combined diameter is slightly smaller than that of the cable 11 so that when the half cylinders 17 are bolted together as at 19, the wire clamp -C- becomes fixed to the cable 11. The pairs of extension plates 15 receive the cable 11 therebetween with a pin 20 spanning the slot between each pair of the plates 15 to prevent the cable 11 from slipping out, and to rotatably support the stand-off -S- on the cable 11. At the other end of the stand-off plate 14 are ring retaining plates 21 mounted on each side thereof with a bore 22 extending therethrough for receiving the ring 23 therein.

The ring 23 extends about a pin 24 removably mounted on the upper end of a swivel 25 whose lower end is provided with a pin 26 that is received by a bore 27 in a tab 28 that extends upwardly of a disk shaped support member 29.

The support disk 29 which rotatably supports the housing -H- at its precise mid-portion is provided with a ball bearing race 30 whose seat 31 extending about the axis of the housing is secured to the mid-portion of a hollow cylinder 33 with ball bearings 32 interposed therebetween whereby the cylinder 33 and other structure secured thereto are rotatably mounted in a vertical plane with relation to the support member 29.

The cylinder 33 forms a chamber 34 in which certain instruments, batteries and the like are contained and which are enclosed by lids or covers 35 removably and securely mounted at the ends thereof. The lids 35 are sealed and locked in place in the identical manner as explained in detail in my copending patent application No. 564,600 and filed on Apr. 3, 1975 for Closure Locking And Orienting Device. The lids 35 bear against a peripheral shoulder 36 formed adjacent the ends of the cylinder 33 and are provided with an O-ring 37 fitted into a peripheral groove 38 formed about the lids 35. The O-ring 37 bears against the inner surface of the cylinder 33 to render it watertight. A pair of mating semi-cylindrical grooves 39 and 40 are formed about the lids 35 and the inner surface of the cylinder 33 respectively which receive a pliable member 41 such as, a nylon monofilament through a bore 42 formed through the shell of the cylinder 33. The bore 42 which communicates with the semi-cylidrical groove 40 and with the mating groove 39 on the lid 35 is of approximately the same diameter as the combined grooves 40 and 39 so as to permit the member 41 to slide through the bore 42 and into the bores 39 and 40 around the lids 35 to span the juncture of the lid 35 and cylinder 33 and to lock the lids 35 in place thereon.

The housing -H- consists of a pair of conical shaped members 43 both of whom are identical in shape and size and fitted over and secured to the cylinder 33 as explained hereinafter, whereby the members 43 and the cylinder 33 rotate in unison about their common horizontal axis. At the end portion of each of the housing members 43 is a large bore or opening 44 forming a duct for the flow of water therethrough. In order to maintain the axis of the ducts 44 in a horizontal plane at all times, the housing members 43 are weighted as at 45 at the bottom of the members 43. The weights 45 lie in a plane parallel to the horizontal axis of the cylinder 33 and members 43 and are symmetrically disposed about a vertical plane passing through the aforesaid axes. The housing members 43 are secured to the cylinder 33 by means of a bolt 46 received through a bore 47 and threaded into a blind threaded bore 48 formed in the lid 35. The bores 47 extend transversely of the duct 44. A bore 49 in the end of the housing members 43 and in axial alignment with the bore 47 permits a tool to be inserted therethrough for tightening the bolt 46 in place. A further bore 65 extends transversely of the housing members 43 adjacent the ends thereof in alignment with the bore 42 of the cylinder 33. When desiring to secure the lids or covers 35 to the cylinder 33, the pliable member 41 is inserted through the bores 65 and 42 to be received by the mating semi-cylindrical bores 39 and 40 whereby the lid 35 becomes locked to cylinder 33. The proper orienting of the lids 35 with relation to the housing 43 is also effected as explained in detail in my aforesaid patent application.

There is a second bore 69 having a peripheral shoulder 53 that extends from the duct 44 through the lids 35 for receiving a stem 50 of a conventional water current meter or odometer 51. The bore 69 lies in a horizontal plane passing through the axis of the duct 44 but off-set from the axis itself so that the blades 52 of the water meter 51 will always be facing in the direction of the oncoming flow of water.

The stem 50 of the water meter 51 which is provided with a shoulder 54 that bears against the shoulder 53 of the bore 49 has a threaded end portion 55 extending beyond the inner surface of the lid 35 and is secured thereto by a knurled nut 56 threaded thereon. The stem 50 is also provided with an O-ring 57 that renders the juncture of the lid bore 49 and the stem 50 watertight. There is also an axial bore 58 extending through the stem 50 for receiving wires or electrical conductors 59 that connect the meter 51 to recorders 60. Positioned in the chamber 34 of the cylinder 33 is a source of power or battery (not shown) contained in a receptacle 61 by means of wires 62. Also contained in the receptacle 61 are other instruments needed to record the direction the housing -H- is facing such as a compass and the like.

In order to be assured that the housing -H- is facing in the direction in which the water is flowing from and not by 180 degrees removed therefrom, there is a pair of rudders 63 and 64 that are attached to the support disc or ring 29 by means of rods 66 and 67 respectively, threaded into bores 68 formed into the support ring 29. The rudder 63 is constructed of material having a slightly negative buoyancy while that of rudder 64 is constructed of material having a slightly positive buoyancy and the stems 66 and 67 extend at an angle of approximately 30° below and above a horizontal plane passing through the axis of the ring support 29. The rudders 63 and 64 not only steer the housing -H- so that the members 43 always extend in a direction normal to and facing the flow of water movement but acts as a dampening device for any oscillatory movements of the housing -H- that are caused by wave motions, movement of the lines 11 attached to the device 10 and sometimes by the high velocity of the water being measured.

In the normal use of my apparatus 10 for determining the velocity and direction of current flow in a body of water, a number of such apparatuses 10 are attached to a line or cable 11 and placed in the water with the anchor 12 secured at one end of the cable 11 and a float 13 at the other end. The line 11 can be maintained in a taut condition by using a line that is shorter in length than the depth of water or as shown can be longer than the depth of water and become non-taut but in either instance my apparatuses 10 will operate the same and the instruments carried thereby will attain the same results.

After the apparatuses 10 are in the water, the stand-offs -S- will permit the housings -H- to hang downwardly away from any possible entanglement with the cable 11 and to be free to rotate about the swivel 25 in a horizontal plane. The forces of water flow or currents striking the rudders 63 and 64 will cause the housing -H- to face directly into the direction from which the water is flowing. At the same time, the weighted portions 45 of the housing members 43 will cause the housing members 43 and cylinder 33 to rotate with relation to the support ring 29 about in vertical plane to assume their normal position which is one in which a plane passing through the axis of the ducts 44 will be in the horizontal plane. This position which is optimum for measuring the direction of the flow of a current and its velocity is maintained at all times and under all conditions, whether the velocity of the current is minimal or high, whether the waters are calm or in highly turbulent condition and whether the line 11 is swinging about due to the movement of the water.

As stated hereinabove, in order that the meter 51 register the velocity of the waterflow or current accurately two conditions as to the position of the apparatus 10 must exist at all times with relation to the direction of the current or moving body of water. The first condition is that the housing -H- must lie exactly at right angle to the direction of flow of water and secondly, facing in the direction from which the water is flowing. In otherwords, a vertical plane passing through the longitudinal axis of the housing -H- will be at exactly right angle to the direction of flow of the current. This position which is effected by the rudders 63 and 64 will indicate the direction of current flow recorded by the instruments 60. Also, in order to obtain a true reading as to the velocity of the current, the axis of the ducts 44 must lie in the horizontal plane. This is effected by the weighted portions 45 whose center of gravity lies in a vertical plane that is at right angle to a vertical plane passing through the axis of the ducts 44.

The rudders 63 and 64 provide two very vital functions to the apparatus 10. The first function is to enhance and assure the horizontal confrontation of the ducts to the horizontal directional current flow. In other words, if the current flow is to the north, the housings -H- will face directly south. The second function of the rudders 63 and 64 is to provide a dampening and ballast effect on the tendency in certain circumstances of the housings -H- to oscillate or vibrate in both a horizontal and vertical planes.

In the instance of a strong current of say more than 3 knots, there is a tendency for the housing -H- to oscillate in the horizontal plane. If such occurs, the sidewise sweeping movement of the rudders 63, 64 in a horizontal plane will offer resistance to the oscillatory movement of the housing -H- and thereby minimize such movements. In addition, when using a non-taut line 11 with the float 13 lying on the surface of the water, the float 13 will rise and fall with the wave motions. The position as well as the attitude of the stand-offs -S- will vary as the float 13 rises and falls with the waves and the line 11 becomes successively taut and non-taut as the line 11 itself moves up and down. As the float 13 rises and falls, the stand-off -S- will rise and fall with it but the housing -S- will lag behind it since the housing -S- offers more resistance to movement in water due to its size being larger than the stand-off -S-. Since the rudders 63 and 64 offer resistance to and will dampen any movement other than in a vertical plane, the housing -S- will always be normal to the flow of current and the weighted portions 45 will maintain the axis of the ducts 44 in their horizontal position while the support ring 29 will rotate during the up and down movements of the stand-off.

It is readily noted by the above description taken in connection with drawings, that the rudders 63 and 64 secured to the support disc 28 form a balanced drag to the housing -H- and thereby maintain the housing -H- normal to the flow of water at all times tending to prevent any attempt of the housing -H- to swing out of such a position and to dampen any oscillations of the housing -H- that may occur. Since the housing -H- is weighted at its bottom portion to remain upright with the ducts in a horizontal position and the housing -H- being rotatably mounted on the support disc 29, the ducts 44 will always face the flow of water with their axis in alignment with the direction of flow. The meters 51 being acted on by the flow of water passing through the ducts 44 will then measure the current flow with accuracy.

It is obvious that my housing -H- can receive any instrument in place of the water meter 51, whose requirements compel the instrument be positioned in a body of water normal to the water flow and in horizontal alignment therewith. One such instrument is an acoustical device for ascertaining doppler effect of sound in water. Also, nets may be mounted at the ducts 44 for collecting matter, such as algae and the like in determing with accuracy the quantity of such matter flowing with the water current.

Having disclosed my invention, what I claim as new and desire to secure by Letters Patent is:

1. A dynamically balanced apparatus for water borne instruments comprising an elongated member having horizontal and vertical axes and arm portions extending along said horizontal axis, support means rotatably supporting said arm portions in a substantially balanced position whereby said horizontal axis lies in the horizontal plane, pivot means mounted on said support means permitting the pivotal movement of said arm portions in said horizontal plane, weighted means secured to said arm portions compelling said arm portions to rotate about said horizontal axis to assume a predetermined position, at least one vane mounted on said support means lying in a substantially vertical plane parallel to said vertical axis and at right angle to said horizontal axis and water flow actuating means mounted on each of said arm portions substantially equidistant from said support means and along said horizontal axis.

2. The structure as recited by claim 1 wherein said support means rotatably support said arm portions at substantially the mid-portion thereof.

3. The structure as recited by claim 2 wherein said arm portions are conical in configuration and symmetrically disposed about said rotatable support, and said weighted means comprising weight positioned at the lowermost portion of said conical arm portions in alignment with the vertical plane passing through said horizontal axis.

4. The structure as recited by claim 3 taken in combination with a stand-off adapted to be rotatably mounted on a pliable member having an anchor at one end and a float at the other end, said stand-off having a free end spaced from said one end, swivel means connecting said free end of said stand-off and said support means.

5. The structure as recited by claim 4 wherein each of said arm portions has a duct extending therethrough adjacent the ends thereof, said ducts having an axis lying in said horizontal plane and a water meter mounted in each of said ducts for measuring the velocity of water passing therethrough.

6. A dynamically balanced apparatus for water borne instruments comprising a hollow cylindrical housing, a disc shaped support member rotatably mounted about said housing at substantially the mid-portion thereof, a cone shaped arm portion mounted on said cylindrical housing on each side of said support member and having a free end portion extending beyond said cylindrical housing, a duct extending through said arm portions adjacent said free end portions, said ducts having an axis, weight means mounted along the other end portions of said arm portions causing said axis of said ducts to lie in a horizontal plane, a lid secured to each end of said cylindrical member forming an enclosed chamber, and locking means securing said arm portions to said lids.

7. The structure as recited by claim 6 taken in combination with at least one extensible member secured at one end on a rear portion of said support member and a vane mounted on the free end of said extensible member to steer said housing in a body of water.

8. The structure as recited by claim 7 taken in combination with a second extensible member secured at one end to said rear portion of said support, a second vane mounted on the free end of said second extensible member said extensible members lying in a vertical plane and normally extending at an acute angle on each side of a horizontal plane passing through said axis.

9. The structure as recited by claim 8, taken in combination with a stand-off rotatably secured along one edge portion to a pliable member anchored in water at one end and having a float secured to the other end, swivel means connected to the other edge portion of said stand-off and pivot means connecting said swivel means and said support member.

* * * * *